July 23, 1968  G. DIEHR  3,393,648

AIR BEARING TABLE

Filed Dec. 28, 1965  2 Sheets-Sheet 1

INVENTOR.
GEORGE DIEHR
BY
James P. Malone

July 23, 1968          G. DIEHR          3,393,648

AIR BEARING TABLE

Filed Dec. 28, 1965          2 Sheets-Sheet 2

INVENTOR.
GEORGE DIEHR
BY James P. Malone

United States Patent Office 3,393,648
Patented July 23, 1968

3,393,648
AIR BEARING TABLE
George Diehr, North Babylon, N.Y., assignor to
OPTOmechanisms, Inc., Plainview, N.Y.
Filed Dec. 28, 1965, Ser. No. 516,985
8 Claims. (Cl. 108—102)

This invention relates to a table having a movable platform mounted with an air bearing.

More particularly the invention relates to a table having a movable platform for mounting for instance, optical instruments. The platform is mounted on a rail on the table with an air bearing so that the platform may be moved accurately in very small increments.

Specifically the invention generally comprises a base member having a large rail for guiding the movable platform. The base member and the platform are made of a temperature insensitive material for instance, granite or equivalent. The purpose of this is to provide a stable base for making very small measurements. In order to overcome starting friction so that very small movement may be obtained, the applicant has mounted the platform on an air bearing. The air bearing means comprises a plurality of air bearing blocks connected to the underside of the platform, the blocks having apertures and slots facing the rails and the base. A source of air, for instance 20 lbs. per square inch, is connected to the blocks so that the platform floats on a film of air. Means are provided to move the platform along the rail comprising a variable speed motor driven tape which is adapted to move the platform in either direction. The movement of the platform may be read by precision optical apparatus for instance, an interferometer.

The platform has suitable arranegments for mounting the optical equipment for instance, a microscope. The device is designed for making precise optical measurements, the pitch of screws or the spacing of optical elements, dimensions of gauge blocks and other equivalent measurements which are made in micro-inches.

Accordingly, a principal object of the invention is to provide new and improved optical measuring means including an air bearing platform.

Another object of the invention is to provide new and improved air bearing mounting means for optical viewing instruments wherein the mounting has negligible friction so that the platform may be moved in very small increments.

Another object of the invention is to provide new and improved air bearing table and platform means and means to damp out oscillation of the platform relative to the table.

Another object of the invention is to provide new and improved anti-friction means for moving optical components which are temperature insensitive for instance, where the components comprises stone or ceramic materials.

Another object of the invention is to provide a new and improved air bearing table comprising a base member, a solid rail member mounted on said base, a platform and means to movably mount said platform on said rail comprising a plurality of air bearing blocks fixedly connected to said platform said blocks being adapted to fit closely to said base and said rail, said blocks having apertures on their surfaces facing said rail and said base, means to apply air pressure to said blocks whereby the air issuing from said apertures forms an air bearing film for said platform.

Another object of the invention is to provide a new and improved table which moves on or over a thin film of air.

Another object of the invention is to provide a new and improved stable table which can be moved in increments of one millionth of an inch on which indicating devices such as optical, microscope, electronic sensing gages, capacitance sensing gages may be attached.

These and other objects of the invention will be apparent from the following specification and drawings of which:

Figure 1:
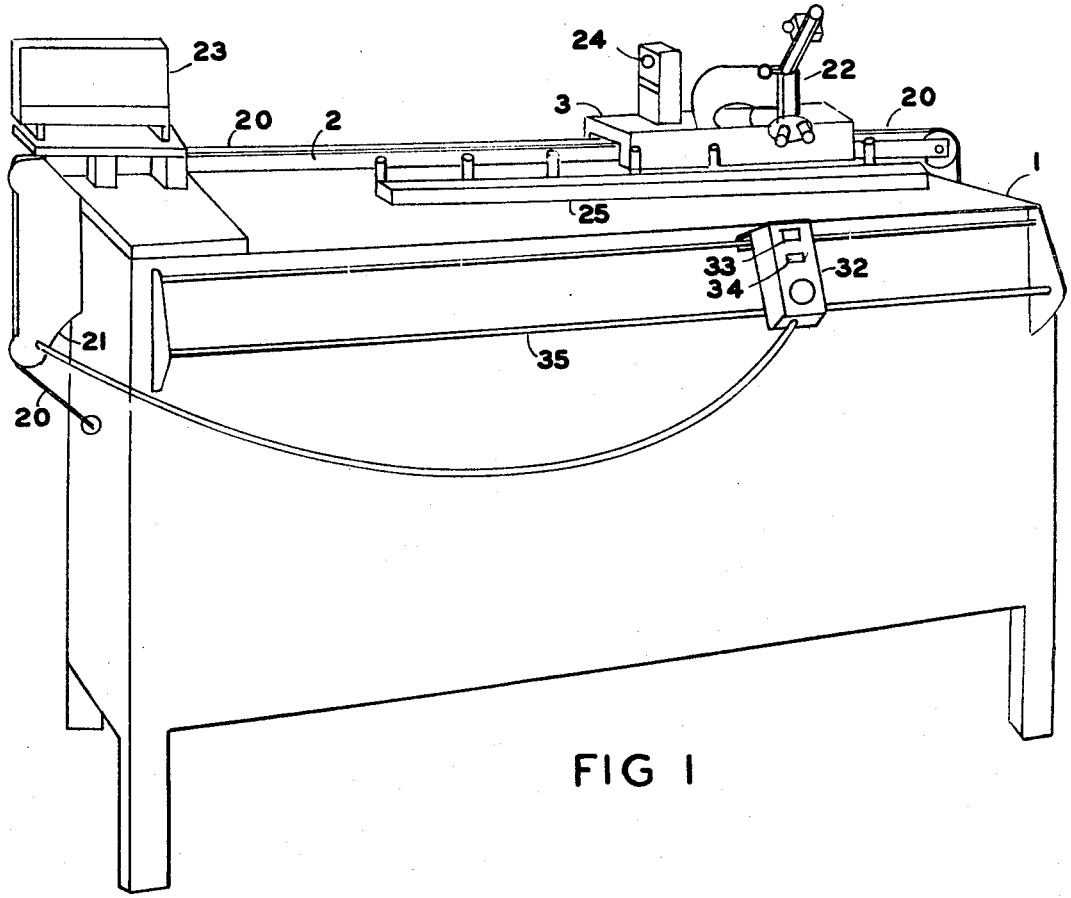
FIGURE 1 is a perspective view of an embodiment of the invention.
Figure 2:
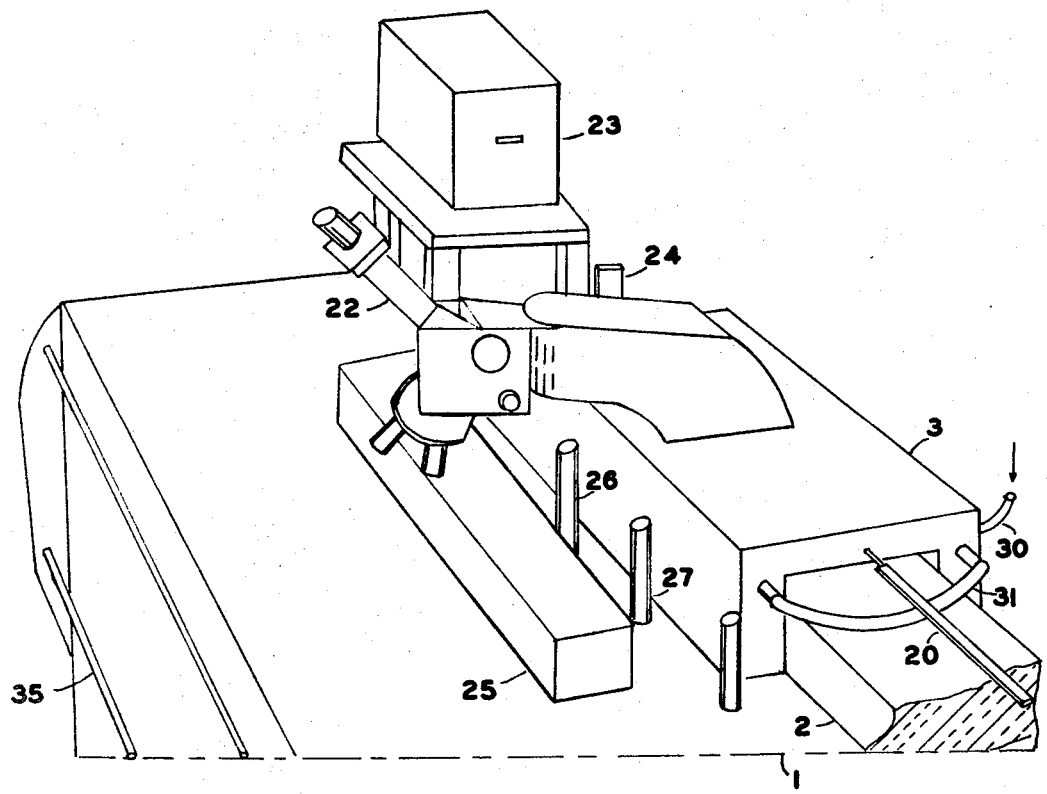
FIGURE 2 is a enlarged perspective view of a portion of the embodiment of FIGURE 1.

Referring to FIGURES 1 and 2, the invention generally comprises a base member 1 which is temperature insensitive for instance, a block of granite, stable meehanite iron, or gray cast iron materials which are also usable, or equivalent. Fixedly mounted on the top of the base 1 is a rail 2 which is preferably of the same material. The platform 3 is movably mounted and straddles the rail and is preferably of the same material.

Figures 3, 4:
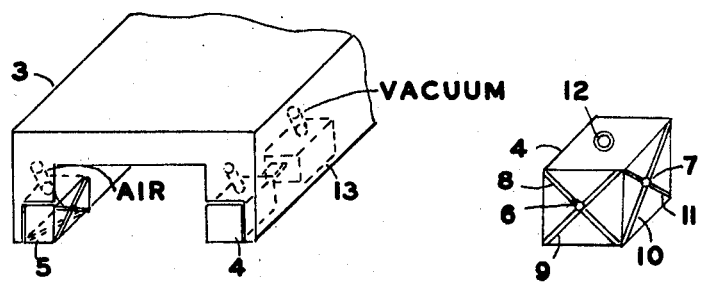
FIGURE 3 is a perspective detail view illustrating the mounting of the air bearing blocks and dampening blocks.
FIGURE 4 is a perspective view of an air bearing block.
Figure 5:
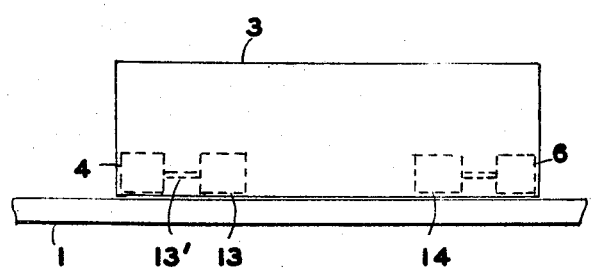
FIGURE 5 is a detail side view partially in section of an embodiment of the invention.

Referring to FIGURES 3, 4, and 5, the platform 3 is slidably mounted by a plurality of air bearing blocks 4, 5, 6, etc. As specifically shown in FIGURE 4, each block has at least one aperture in its bottom and in the side facing the rail. The apertures 6 and 7 communicate with diagonal slots 8, 9, 10, and 11. A source of air is pumped into the bearing block into the fitting 12 which communicates internally with the apertures 6 and 7 thereby providing a film of air between the bearing blocks and the base and rail. The air supply is connected by flexible tubes 30, 31.

The air pressure may be for instance 20 lbs. per square inch. The top and side of the rail and the inner side of the platform are finished to provide a flat surface. The sides of the rail and top need not be polished to optical flatness, slight scratches or intermittent identification will not deter from accuracy providing that the overall flatness or straightness and parallelism is within minute tolerances such as .00005 or .0001 inch. Indentations, which could appear as ridges of .001" providing they are not too frequent and will not deter from its accuracy since the air cushion is an integrator.

One of the problems found in the construction of this device, was a tendency for axial oscillation of the platform. This was rectified by providing brake or dampening blocks 13 and 14 which are mounted to the platform or the air bearing blocks by means of springs 13', etc. The brake blocks tend to dampen out any oscillation by then causing a slight additional friction. They are preferably spring loaded downwardly so as to provide some friction with the top of the base 1. The brake blocks can have a groove or series of grooves similar to block 4 to which vacuum is applied. When vacuum is applied, the friction between the block and adjacent member causes braking action.

The platform is pulled in either direction by means of a tape 20 which may be metal or plastic or by a lead screw drive. The ends of the tape 20 are connected to each end of the platform. The tape 20 is otherwise a continuous tape connected to the variable motor speed drive 21 which preferably has a large range of speeds in order to make small measurements as well as high speed movement for making long measurements. In a typical embodiment, a motor was used together with a transmission which could be connected to provide a high gear ratio. The platform is used to mount an optical viewing device such as microscope 22. The axial measurement of the movement of the platform and therefore of the viewing device may be measured by means having the desired accuracy for instance, an interferometer 23 which cooperates with mirror 24 mounted on the platform to measure the movement of the platform. The motor control 32 is preferably of the hand held type with push buttons 33, 34 for directional control. This facilitates use of the microscope and avoids shock to the base caused by the operator. A rack 35 is provided to receive the control 32 when not in use.

In operation, the work piece 25 to be measured for instance, a gauge block on the top of the plate 1 is located in the proper plane by means of the guides 26, 27, etc. The measurement may be made by positioning the microscope over one end of the gauge block to be measured and zero setting the measuring interferometer. The platform is then moved to the other end of the gauge block and is accurately positioned with the microscope and the reading is then noted.

Various measurements may be made with an accuracy of micro inches for instance the pitch of threads on screws, shafts or the spacing between optical elements. Other similar measurements may be made by those who desire to practice the invention.

The device is substantially insensitive to temperature changes due to the construction of the base, rail and platform of material such as granite.

Therefore, the present invention provides a very sensitive measuring device which may be moved in small increments with no frictional effect and which may be moved in large increments at high speeds. The construction of the base, rail and platform provide a very stable foundation. In this connection, it is preferable that the motor controls not be mounted on the base but rather on a remote control such as a hand held control 32. The purpose of this is so that the operator will not touch any part of the apparatus so that the apparatus will be free from any shocks or temperature variations caused by touching it. The entire base is preferably shock mounted.

Many modifications may be made by those who desire to practice the invention without departing from the scope thereof which is defined by the following claims.

I claim:
1. An air bearing table comprising,
a base member,
a solid rail member mounted on said base,
a platform, and
means to movably mount said platform on said rail comprising a plurality of air bearing blocks fixedly connected to said platform,
said blocks being adapted to fit closely to said base and said rail,
said blocks having apertures on their surfaces facing said rail and said base,
means to apply air pressure to said blocks whereby the air issuing from said apertures forms an air bearing film for said platform,
and brake dampening blocks connected to said platform.
2. Apparatus as in claim 1 wherein said brake blocks are spring loaded down against the surface of said base.
3. Apparatus as in claim 1 wherein said brake blocks are vacuum loaded against an adjacent surface.
4. Apparatus as in claim 3 having means to pull said platform along said rail.
5. Apparatus as in claim 4 wherein said last means comprises a tape to pull said platform in either direction.
6. Apparatus as in claim 5 having motor means to drive said tape.
7. Apparatus as in claim 6 having means to measure the movement of said platform along said rail.
8. Apparatus as in claim 7 having variable speed motor control means connected to said tape and hand held motor control means connected to said control means.

References Cited

UNITED STATES PATENTS

| 1,055,964 | 3/1913 | Ackley et al. | 269—58 |
| 1,232,757 | 7/1917 | Berkey | 108—137 |
| 2,942,385 | 6/1960 | Pal. | |
| 3,155,383 | 11/1964 | Whitmore | 108—143 X |

FOREIGN PATENTS 1,309,221   10/1962   France.

FRANCIS K. ZUGEL, *Primary Examiner.*